United States Patent [19]

Ishii et al.

[11] Patent Number: 5,693,285
[45] Date of Patent: *Dec. 2, 1997

[54] PROCESS FOR PRODUCING MOLDED PRODUCT

[75] Inventors: Hirohisa Ishii; Toshihiko Nishida; Kunio Gohda, all of Chiba-ken, Japan

[73] Assignee: Chisso Corporation, Ohsaka-fu, Japan

[*] Notice: The term of this patent shall not extend beyond the expiration date of Pat. No. 5,458,845.

[21] Appl. No.: 503,390

[22] Filed: Jul. 17, 1995

Related U.S. Application Data

[63] Continuation-in-part of Ser. No. 113,226, Aug. 27, 1993, Pat. No. 5,458,845.

[30] Foreign Application Priority Data

Dec. 2, 1992 [JP] Japan ............................ HEI4-349728

[51] Int. Cl.$^6$ ........................................... B29C 71/00
[52] U.S. Cl. ..................... 264/515; 264/446; 264/235; 264/346; 264/492
[58] Field of Search ...................... 264/481, 488, 264/489, 491, 492, 480, 479, 490, 493, 345, 346, 515, 446, 235, 230, 234, 500, 545

[56] References Cited

U.S. PATENT DOCUMENTS

| | | | |
|---|---|---|---|
| 3,317,642 | 5/1967 | Bailey | 264/346 |
| 3,555,135 | 1/1971 | Paul | 264/346 |
| 4,258,142 | 3/1981 | Ohzeki et al. | |
| 4,594,204 | 6/1986 | Heidenreich et al. | 264/492 |
| 4,933,123 | 6/1990 | Yoshida et al. | |
| 5,259,999 | 11/1993 | Iwakiri et al. | 264/493 |
| 5,458,845 | 10/1995 | Ishii et al. | 264/515 |
| 5,484,560 | 1/1996 | Moriyama et al. | 264/483 |
| 5,489,404 | 2/1996 | LeGrand et al. | 264/346 |

FOREIGN PATENT DOCUMENTS

| | | | |
|---|---|---|---|
| 3336244 | 4/1985 | Germany | 264/492 |
| 57-138994 | 8/1982 | Japan | 264/492 |

*Primary Examiner*—Mathieu D. Vargot
*Attorney, Agent, or Firm*—Fay, Sharpe, Beall, Fagan, Minnich & McKee

[57] ABSTRACT

A process for producing a hollow or sheet molded product having a superior appearance is provided, which process is characterized in that a multi-layer molded product having a surface layer (A) of a propylene random polymer of m.p. of 100° to 150° C. having a thickness of 1 to 20% of that of the molded product, and a substrate layer (B) of a thermoplastic resin of a m.p. higher than that of the propylene random polymer is formed and the surface layer (A) is heat-treated into a molten state, followed by immediately cooling to form a smooth surface.

4 Claims, No Drawings

PROCESS FOR PRODUCING MOLDED PRODUCT

This is a continuation-in-part of application Ser. No. 08/113,226 filed on Aug. 27, 1993, now U.S. Pat. No. 5,458,845.

BACKGROUND OF THE INVENTION

1. Field of the Invention

This invention relates to a process for producing a molded product. More .particularly. it relates to a process for producing a molded product of a good appearance having a good moldability, a good luster and superior uniformity of a product appearance. 2. Description of the Related Art The appearance of conventional hollow vessels and multi-layer sheets has been still insufficient to satisfy the needs of markets. Thus, improvement in the surface appearance, particularly, notable improvement in the luster and the uniformity of the surface have become a very serious problem. Polypropylene resins have a number of superior characteristics such as stiffness, impact strength, heat resistance, hygienic properties, resistance to steam permeability, moldability, etc.; hence the resins have been very often Used for producing hollow vessels according to a blow molding, and multi-layer sheets according to a multi-layer molding. On the other hand, however, the resins have drawbacks of being inferior in the gas barrier properties against oxygen, nitrogen, $CO_2$ gas, etc. Thus, for the use applications of food vessels for soft drinks, flavoring materials, edible oils, etc., hollow vessels and multi-layer sheets wherein polyolefin resins are used as the inner and outer layers and resins having good gas-barrier properties such as ethylene-polyvinyl alcohol copolymer, nylon, etc. are used as the intermediate layer, have been used in a large quantity.

As a countermeasure for solving such a problem, for example, there has been known a process of using random ethylene-propylene copolymer as the outermost surface layer of a multi-layer vessel to improve the surface luster, as disclosed in Japanese patent application laid-open No. Hei 2-215529, but in the case of hollow molding, since degassing of air in the mold is insufficient; hence the luster is insufficient and luster unevenness occurs. Thus, a problem has been raised that the commodity value cannot be sufficient and the use applications are limited.

SUMMARY OF THE INVENTION

The object of the present invention is to provide a process for easily producing a hollow vessel or a multi-layer sheet having notably improved the insufficient luster and luster unevenness which have been drawbacks of conventional molded products, and having an good appearance by which the commodity value has been notably enhanced, while keeping various superior properties alive.

The present inventors have made extensive research in order to obtain a hollow vessel and a sheet having overcome the drawbacks of conventional process and having a superior surface luster, and as a result, have found that when the outer surface of a specified multi-layer molded product is heat-treated into a molten state, the resulting product has a far superior appearance.

Further, it has been found that a multi-layer molded product having an even luster, an improved scratch resistance, and a far superior appearance can be produced by using a polypropylene composition having a crystal-nucleating agent blended therein.

An aspect of the present invention is concerned with a multi-layer molded product having a surface layer (A) comprising a propylene random polymer of a melting point of 100° to 150° and having a thickness of 1 to 20% of the multi-layer molded product, and a substrate layer (B) comprising a thermoplastic resin of a melting point higher than that of said propylene random polymer, said surface layer (A) having a crystal-nucleating agent blended therein. The crystal-nucleating agent is selected from the group consisting of dibenzylidenesorbitols and their derivatives, aluminum 4-t-butyl benzoate, sodium 4-t-butyl benzoate, basic polyvalent metal salts of cyclic phosphoric acid esters, and alkali metal salts of organic acids, and combinations thereof. The multi-layer molded product may be in a shape of a blow molded bottle or a shape of a sheet.

Another aspect of the present invention is concerned with a process for producing the multi-layer molded product having a surface layer (A) comprising a propylene random polymer of a melting point of 100° to 150° C., having a thickness of 1 to 20% of said multi-layer molded product, and having the crystal-nucleating agent blended therein, and a substrate layer (B) comprising a thermoplastic resin of a melting point higher than that of said propylene random polymer, which process comprising heating said surface layer (A) to a temperature 10° to 50° C. higher than the melting point of said surface layer (A) with hot air blown onto said surface layer (A) for 25 to 120 seconds to create a molten surface and cooling said surface immediately after creation of said molten surface to form a smooth surface.

DETAILED DESCRIPTION OF PREFERRED EMBODIMENTS

The propylene random polymer used in the surface layer (A) of the molded product of the present invention has a melting point of 100° to 150° C. preferably 120° to 145° C., and preferably a melt flow rate of 0.5 to 50 g/10 min at 230° C. If the melting point of the propylene random polymer exceeds 150° C., it is difficult to afford a desired temperature difference between the temperatures of the surface layer resin and the substrate layer resin and a sufficient luster cannot be obtained. If the melting point is lower than 100° C. the molded product is difficult to release from the mold after molding, and the increase in the percentage of rejects and the reduction in the productivity are brought about; hence the aim of the present invention cannot be achieved.

The melting point referred to herein means the peak temperature on the endothermic curve measured by means of a scanning type differential calorimeter when the temperature of a sample (10 mg) is raised in introgen atmosphere at a rate of 20° C./min.. The peak temperature is appeared by the fusion of crystals of the sample.

The propylene random polymer is obtained by copolymerizing propylene as a main component with α-olefin such as ethylene, butene-1, etc. as comonomer components. The propylene random polymer is a known polymer and can be used as far as the melting point thereof is specified. In the case ethylene-propylene random copolymer, if the ethylene content exceeds 2% by weight, the resulting copolymer has a melting point of about 150° C. or lower. Therefore the ethylene content is preferably 2 to 8% by weight. Further, the propylene random copolymer may be a random propylene terpolymer of propylene, ethylene and butene-1.

Further, the surface layer (A) may be of a blend of the propylene random polymer with an isotactic polypropylene or a crystalline propylene-ethylene copolymer containing ethylene which content is of 2% by weight or less, or a blend of the propylene random polymer with a linear low density polyethylene, a low density polyethylene or a high density polyethylene which content is in the range wherein the object of the present invention is not damaged. Further, various known additives such as an antioxidant, a weathering agent, an ultraviolet light absorber, an antistatic agent, a coloring agent, filler, hollow filler, or an organic nucleating agent, an inorganic nucleating agent such as talc, etc., may be added to the above components. Further, various known thermoplastic resins such as hydrogenated petroleum resin, elastomers, etc. may be added to the above components in a range wherein the object of the present invention is not damaged.

When the nucleating agent was blended in the surface layer (A), it is possible to improve the uniformity in the luster and a scratch resistance of the surface layer when a heat treatment to melt the surface layer (A) was carried out.

As the crystal-nucleating agent, the following can be mentioned:

Dibenzylidenesorbitols and their derivatives, aluminum 4-t-butyl benzoate, sodium 4-t-butyl benzoate, basic polyvalent metal salts of cyclic phosphoric acid esters, and alkali metal salts of organic acids, and combinations thereof. A multi-layer hollow molded product obtained by using dibenzylidenesorbitols and their derivatives has a superior surface-smoothness and a uniform and far higher luster in particular.

The quantity of the crystal-nucleating agent to be blended is preferably 0.05 to 0.8%, more preferably 0.1 to 0.8%, and most desirably 0.15 to 0.4% each by weight based on the olefin polymer in the surface layer (A).

As the dibenzylidenesorbitols and their derivatives, the following are exemplified:

1,3,2,4-Dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene) sorbitol, 1,3,2,4-di(p-n-propylbenzylidene) sorbitol, 1,3,2,4-di(p-i-propylbenzylidene) sorbitol, 1,3,2,4-di(p-n-butylbenzylidene)sorbitol, 1,3,2,4-di(p-s-butylbenzylidene) sorbitol, 1,3,2,4-di(p-t-butylbenzylidene)sorbitol, 1,3,2,4-di (2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlorobenzylidene-2,4-p-methylbenzylidenesorbitol, 1,3-p-chlorobenzylidene-2,4-p-ethylbenzylidenesorbitol, 1,3-p-methylbenzylidene-2,4-p-chlorobenzylidenesorbitol, 1,3-p-ethylbenzylidene-2,4-p-chlorobenzylidenesorbitol, and 1,3,2,4-di(p-chlorobenzylidene) sorbitol.

As the basic polyvalent metal salt of cyclic phosphoric acid ester, the following are exemplified:

Calcium-2,2'-methylene-bis(4,6-di-t-butylphenyl) phosphate, magnesium-2,2-methylene-bis(4,6-di-t-butylphenyl)phosphate, zinc-2,2'-methylene-bis(4,6-dibutylphenyl)phosphate, aluminum-2,2'-methylene-bis(4,6-di-t-butylphenyl)phosphate, calcium-2,2'-methylene-bis(4-methyl-6-t-butylphenyl)phosphate, calcium-2,2'-ethylidene-bis(4,6-di-t-butylphenyl)phosphate, aluminumhydroxy-2,2'-methylene bis(4,6 dibutylphenyl)phosphate, titaniumdihydroxy-2,2'-methylene-bis(4,6-di-t-butylphenyl) phosphate, tindihydroxy-2,2'-methylene-bis(4,6-di-t-butylphenyl)phosphate, zirconiumoxy-2,2'-methylene-bis (4,6-di-t-butylphenyl)phosphate, aluminumhydroxy-2,2'-methylene-bis(4-methyl-6-t-butylphenyl)phosphate, and aluminumhydroxy-2,2'-ethylidene-bis(4,6-di-t-butylphenyl) phosphate. Among them, calcium-2,2'-ethylene-bis-(4,6-di-t-butylphenyl)phosphate, aluminum-2,2'-methylene-bis(4,6-di-t-butylphenyl)phosphate, and aluminumhydroxy-2,2'-methylene-bis(4,6-di-t-butylphenyl)phosphate are preferable in particular.

As the alkali metal salt of organic carboxylic acid, the following are exemplified:

Salts of alkali metals such as lithium, potassium, and sodium of aliphatic monocarboxylic acids such as acetic acid, propionic acid, acrylic acid, lauric acid, mylistic acid, palmitic acid, stearic acid, and oleic acid, aliphatic polycarboxylic acids such as malonic acid, succinic acid, adipic acid, and citric acid, alicyclic carboxylic acids, and aromatic carboxylic acids.

Among the crystal-nucleating agents mentioned above, 1,3,2,4-dibenzylidenesorbitol, 1,3,2,4-di(p-ethylbenzene) sorbitol, 1,3-p-chlorobenzylidene-2,4-p-methylbenzylidenesorbitol, 1,3,2,4-di(p-chlorobenzylidene) sorbitol, and a mixture of aluminumhydroxy-2,2'-methylene-bis(4,6-t-butylphenyl)phosphate with lithium stearate (at a ratio of 1:1) are most desirable.

These compounds may be used alone or as a mixture of two or more of them.

The surface layer (A) containing the above-mentioned propylene random polymer has a surface layer thickness of 1 to 20% based upon the product thickness. If the surface layer thickness exceeds 20% of the product thickness, this has a bad influence upon the intrinsic properties of the product. To the contrary, if the thickness is less than 1% or less than 10 μm, the surface layer is too thin so that the influence of the substrate layer (B) appears and hence the object of the good appearance of the present invention cannot be achieved. The thickness of the molded product is preferably in the range of 200 to 2,000 μm, although it is not limited thereto as far as the object of the present invention is not damaged.

The difference between the melting point of the surface layer (A) and that of the substrate layer (B) is preferably 10° to 50° C., more preferably 20° to 50° C.

The substrate layer (B) of the present invention consists of a thermoplastic resin Having a melting point higher than that of the propylene random polymer used for the surface layer (A), and the difference of its melting point from that of the surface layer (A) is preferably 10° C. or higher, more preferably 20° C. or higher. As the thermoplastic resin used for the substrate layer, polyolefins such as polypropylene, polyethylene, etc., polyesters such as polyethylene terephthalate, PBT, etc., and polyamides such as 6 nylon, 66 nylon, etc. are usable without any limitation.

It is also possible for the multi-layer molded product of the present invention to use besides the surface layer (A) and the substrate layer (B), an intermediate layer of a polyolefin resin, a polyolefin elastomer, a gas barrier resin, etc. or an adhesive layer for improving the adhesion between the surface layer and the substrate layer, each in a range wherein the aim of the present invention is not damaged.

The multi-layer molded product of the present invention can be obtained according to a multi-layer blow molding process employing several screws for extruding the respective components or a similar multi-layer sheet molding process. Among these processes, a multi-layer direct blow molding process and a multi-layer T-die molding process are suitable.

The heat-treatment of the present invention refers to heat-treatment of only the outer surface of the multi-layer molded product into a molten state. As a kind of heating, hot gas heating, irradiation heating, flame heating, etc. are used. By cooling just after the heating, a smooth surface may be formed. It is preferred that only the specified surface layer (A) is rendered to heat-treatment into a molten state without deforming the substrate layer(B). At high temperatures, the treatment can be carried out in a short time. For example, when the heat treatment is carried out with hot gas, a hot gas temperature higher by 10° to 50° C. than the melting point of the surface layer (A) of the molded product for 10 to 120 seconds, and particularly, when the melting point of the surface layer (A) is 126° C., a hot gas temperature of 150° C. for 20 to 35 seconds, and that of 170° C. for 10 to 20 seconds, and further that of 190° C. for 3 to 8 seconds, can be employed.

In the flame heating, & flame such as that of propane gas, etc, is used. The flame heating is carried out till the surface is visually brought into a molten state, and it is distinct from an instantaneous flame heating which has so far been carried out in printing, wherein the surface is not brought into a molten state. At to the flame heating, heating at 800° C. to 1,200° C. for 0.02 to 2 seconds is general, and at about 1,000° C., heating for about 0.1 to 0.5 second is preferred.

As the other heating methods, heated oven type, continuously heating type using a belt conveyor, and irradiation heating using a far infrared rays heating, an infrared rays lamp, etc. can be employed. In the case of irradiation heating, heating is carried out up to a temperature at which the surface layer is brought into a molten state, when the temperature is detected by means of a surface thermometer or the molten state is observed visually. It is preferred for the heating to be carried out uniformly, so that products are rotated in an oven and temperature is adjusted precisely.

The present invention will be described in more detail by way of Examples and Comparative examples, but it should not be construed to be limited thereto.

The evaluation methods of the characteristics employed in Examples and Comparative examples were carried out according to the following methods:

(1) Melting point (abbreviated to m.p. in the examples):

A sample (10 mg) was raised in its temperature starting from room temperature, at a velocity of 20° C./min., in nitrogen gas, by means of a scanning type differential calorimeter. The melting point is measured by the peak temperature (unit: °C.) of the endothermic curve due to the fusion of a crystal.

(2) Melt flow rate at 230° C. (abbreviated to MFR-1 in Table) was measured according to the testing method of JIS K 7210 (1976) (230° C., 2.16 Kgf).

(3) Percentage of luster was measured according to the testing method of JIS K 7105 (1981) (60° mirror surface, percentage of luster) (unit: %).

Comparative Examples 1 to 5 and Examples 1 to 3

A propylene random polymer of m.p. shown in Table 1 as a surface layer material was fed into an extruder for the surface layer, and a polypropylene resin (melt flow rate: 1.5, m.p.: 160° C.) as an inner layer was fed into an extruder for the inner layer), followed by extruding a double layer molten parison at an extrusion diameter of 210° C., and subjecting the parison to blow molding in a blow mold of a temperature of 30° C., to obtain a bottle having an average thickness of 700 μm at its shell part and an inside volume of 500 cc. The thickness of the outer layer was 100 μm and that Of the inner layer was 600 μm. This multi-layer hollow vessel was heat-treated in an oven at 150° C. and 170° C., respectively for 25 sec. and 120 sec. and the characteristics of the thus treated products were compared with those of untreated product. The results are shown in Table 1.

In Examples 1 to 3, 1,3,2,4-dibenzylidenesorbitol was blended with the propylene random polymer for the surface layer.

As apparent from Table 1, it is seen that the multi-layer hollow vessels of Examples 1 to 3, obtained by the present invention have a uniform and good luster as compared with those of the products of Comparative examples 1 to 5.

TABLE 1

| | Surface Layer Material | | | Heat-Treatment | Site and Luster (%) of Multi-Layer Vessel | | | Total Evaluation |
|---|---|---|---|---|---|---|---|---|
| | Polymer Type | m.p. (°C.) | Crystal-nucleating material (PHR) | Conditions (temperature × time) | Upper Part | Central Part | Lower Part | (Luster · Uniformity) |
| Compar. Ex. 1 | PP-1 | 136 | 0 | 150° C. × 120 sec. | 61 | 63 | 60 | Good |
| Compar. Ex. 2 | PP-1 | 136 | 0 | 170° C. × 25 sec. | 63 | 64 | 59 | Good |
| Compar. Ex. 3 | PP-2 | 126 | 0 | 150° C. × 120 sec. | 72 | 71 | 68 | Good |
| Compar. Ex. 4 | PP-2 | 126 | 0 | 170° C. × 25 sec. | 74 | 77 | 73 | Very Good |
| Compar. Ex. 5 | PP-3 | 145 | 0 | 170° C. × 25 sec. | 75 | 78 | 74 | Good |
| Example 1 | PP-2 | 127 | 0.2 | 170° C. × 25 sec. | 87 | 88 | 88 | Best |
| Example 2 | PP-1 | 138 | 0.2 | Propane gas burner | 74 | 75 | 75 | Very good |
| Example 3 | PP-2 | 127 | 0.2 | Propane gas burner | 85 | 85 | 84 | Best |

Note:
1,3,2,4-dibenzylidenesorbitol was used as crystal-nucleating agent.
*Polymer type:
PP-1: Ethylene-propylene random copolymer
Ethylene content: 5.5 wt. %,
MFR-1: 23.5 g/10 min.
PP-2: Ethylene-propylene-α-olefin terpolymer
Ethylene content: 6.5 wt. %,
Butene-1 content: 3.1 wt. %,
MFR-1: 2.1 g/10 min.
PP-3: Ethylene-propylene random copolymer,
Ethylene content: 3.2 wt. %,
MFR-1: 0.6 g/10 min.

What we claim is:

1. A process for producing a multi-layer molded product having a surface layer (A) comprising a propylene random polymer of a melting point of 100° to 150° C., having a thickness of 1 to 20% of said multi-layer molded product, and having a crystal-nucleating agent blended therein, and a substrate layer (B) comprising a thermoplastic resin of a melting point higher than that of said propylene random polymer, which comprising heating said surface layer (A) at a temperature 10° to 50° C. higher than the melting point of said surface layer (A) with hot air blown onto said surface layer (A) for 25 to 120 seconds to create a molten surface and cooling said surface immediately after creation of said molten surface to form a smooth surface.

2. The process according to claim 1 wherein said crystal-nucleating agent is selected from the group consisting of dibenzylidenesorbitols and their derivatives, aluminum 4-t-butyl benzoate, sodium 4-t-butyl benzoate, basic polyvalent metal salts of cyclic phosphoric acid esters, and alkali metal salts of organic acids, and a combination thereof.

3. The process according to claim 1 wherein said multi-layer molded product is in a shape of a blow molded bottle.

4. The process according to claim 1 wherein said multi-layer product is in a shape of a sheet.

* * * * *